Patented Nov. 28, 1950

2,532,044

UNITED STATES PATENT OFFICE 2,532,044

PRODUCTION OF NEW CHLORINE-CONTAINING ETHERS

Joseph F. Walker, Westfield, and Thomas J. Mooney, Perth Amboy, N. J., assignors to E. I. du Pont de Nemours & Company, Wilmington, Del., a corporation of Delaware No Drawing. Application February 21, 1948, Serial No. 10,197

11 Claims. (Cl. 260—615)

This invention relates to the production of new chlorine-containing ethers, and more particularly it relates to the production of delta-chlorobutyl formal and chloromethyl delta-chlorobutyl ether.

It is an object of this invention to produce the two above-mentioned dipolar chlorinated ethers in good yield.

It is another object of this invention to produce the said two ethers in a single reaction step.

Other objects of the invention will appear hereinafter.

In accordance with this invention, delta-chlorobutyl formal and chloromethyl delta-chlorobutyl ether are produced by chemical reaction of tetrahydrofuran with formaldehyde and hydrogen chloride. The materials react in the manner shown by the following two chemical equations:

(1)
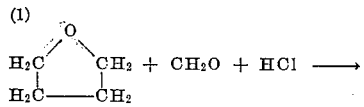
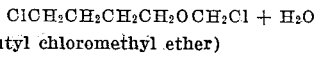

(delta-chlorobutyl chloromethyl ether)

(2)
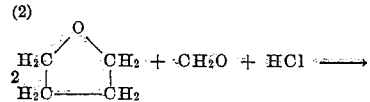
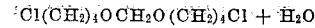

(delta-chlorobutyl formal)

The reactions represented by the above two equations will take place simultaneously regardless of the proportions of the reactants, it being only necessary to bring together the three reactants at any temperature between 0° C. and the boiling point temperature of the reaction mixture. Under particular conditions as described below, however, the reaction represented by one or the other of the two equations can be made to greatly predominate.

In order to obtain large yields, it is preferred to carry out the reaction with a formaldehyde polymer which will readily yield formaldehyde under acid conditions, for example paraformaldehyde and trioxane, as the source of formaldehyde, and by the use of substantially anhydrous hydrogen chloride so that the only water present will be that amount present in the formaldehyde polymer, for example if paraformaldehyde is used, 2% to 7% based on the weight of the paraformaldehyde, and that which is formed in the reaction. Aqueous solutions of formaldehyde and hydrogen chloride may be employed to obtain useful yields if the water content of the reaction mixture is maintained at less than about 50% by weight of the reaction mixture.

Predominant amounts of the delta-chlorobutyl chloromethyl ether will be obtained if the ratio of formaldehyde to tetrahydrofuran is greater than equimolecular. If, on the other hand, this ratio is less than equimolecular, predominating amounts of delta-chlorobutyl formal will be formed. Aqueous solutions will produce only limited amounts of delta-chlorobutyl chloromethyl ether and the product is chiefly delta chlorobutyl formal. To obtain the best yields of the delta-chlorobutyl chloromethyl ether, it is preferred that the formaldehyde be added to the tetrahydrofuran in the form of paraformaldehyde and in the ratio of between 1.5 to 3.0 moles of formaldehyde to each mole of tetrahydrofuran, and the HCl be passed into this mixture in the form of anhydrous gas until no more is consumed in the reaction mixture. It is also preferred that the reaction temperature be maintained between 10° C. and 40° C., and that the reaction be carried out in the presence of a metal chloride as a catalyst. For example, zinc chloride, ferric chloride, bismuth chloride, and aluminum chloride may be used as catalysts. The amount of metal chloride used as catalyst in the reaction mixture is not critical; however, to obtain best results, it is preferred that it be present in an amount of at least 5% of the combined weight of the tetrahydrofuran and formaldehyde. Yields of the chlorobutyl chloromethyl ether up to 80% of theoretical can be obtained in this manner.

The preferred process for the production of delta-chlorobutyl formal comprises the addition of formaldehyde, in the form of paraformaldehyde, to the tetrahydrofuran in the ratio of 1.5 to 3.0 moles of tetrahydrofuran to each mole of formaldehyde, and passing anhydrous HCl gas into the mixture until completion of the reaction at a temperature between 10° C. and 40° C. After the addition of the HCl gas is completed, i. e., until no more HCl gas is consumed, the reaction mixture is preferably heated to reflux for several hours, e. g., two to ten hours. Yields of delta-chlorobutyl formal up to nearly 80% of theoretical have been obtained in this manner.

Although relatively large yields of either of the two ethers of this invention can be obtained as above described, the reaction will always be accompanied by the production of some of the other ether. The two ethers are most readily isolated from the reaction mixture by drying, for example, over calcium chloride, and vacuum distilling, the delta-chlorobutyl chloromethyl ether boiling at 68° C. to 70° C. at 3 mm. Hg, and the delta-chlorobutyl formal boiling at 121° C. to 123° C. at 2 mm. Hg. Any other method of isolating the ethers may, however, be employed.

Delta-chlorobutyl chloromethyl ether is a colorless liquid which is readily soluble in methylene chloride, ether, and methanol, but decomposes in water, liberating formaldehyde and hydrogen chloride. Delta-chlorobutyl formal is a sweet-smelling, colorless liquid, readily soluble in methanol, ether, and methylene chloride, but is insoluble in water. It is quite stable to hydrolysis by aqueous caustic soda. On heating it with solid caustic soda, tetrahydrofuran is regenerated with formation of sodium chloride, sodium formate, and probably methanol.

The following examples are given to illustrate in detail preferred processes for the production of predominating amounts of the two ethers of this invention. It is to be understood, of course, that the details of these examples are not to be taken as limitative of the invention.

*Example I*

To 288 grams of tetrahydrofuran (4 moles) in a one-liter, round-bottom flask was added 253 grams of paraformaldehyde (8.1 moles) and 100 grams of anhydrous zinc chloride. With rapid agitation this mixture was saturated with anhydrous hydrogen chloride, keeping the temperature between 15° C. and 30° C. After the mixture would absorb no more hydrogen chloride, it was allowed to stand overnight at room temperature. The top layer was then separated from the reaction mixture, dried, and vacuum distilled. A yield of 430 grams (68% of theory) of delta-chlorobutyl chloromethyl ether, boiling at 68° C. to 76° C. at 2-5 mm. pressure, was obtained. The structure of the purified product was determined from the fact that it contained 41.9% Cl (theory 45.2%), as determined by Parr bomb combustion, only half of which would be removed easily with alcoholic KOH at room temperature. Its molecular weight was determined by the Menzies-Wright ebullioscopic method as 147 (theory 157).

*Example II*

Three-hundred and forty-seven (347) grams (10.1 moles) of paraformaldehyde was suspended in 1440 (20.0 moles) grams of tetrahydrofuran. With good agitation, anhydrous hydrogen chloride was passed in for 12 hours at 20° C., 1153 grams being added in all. The mixture was then heated to reflux for seven hours, dried over calcium chloride, and vacuum distilled. A yield of 1744 grams (76% of theory) of delta-chlorobutyl formal, a product boiling at 133° C. to 145° C. at 12-19 mm. pressure, was obtained with a 10% yield of chloromethyl chlorobutyl ether as a by-product. The delta-chlorobutyl formal was found to contain 30.5% chlorine (theory 31.0%). The chlorine in this compound is not readily removed with alcoholic KOH at room temperature. This structure was confirmed by its conversion to delta-methoxybutyl formal. (See Example IV.)

*Example III*

To a slurry of 126 grams of paraformaldehyde in 600 cc. of concentrated HCl, 144 grams of tetrahydrofuran was added. The resulting mixture was agitated for one hour and was then allowed to stand for approximately 60 hours at room temperature. After this period, the mixture was refluxed at its boiling point about three hours. On refluxing, the mixture was separated into two phases. The non-aqueous phase was removed by means of a separatory funnel and dried over calcium chloride. On vacuum distillation, 41 grams of delta-chlorobutyl chloromethyl ether and 112 grams of delta-chlorobutyl formal were isolated. This represented yields of 13% and 53%, respectively, for the two products as calculated on the tetrahydrofuran charged.

Attempts were made to react tetrahydropyran with formaldehyde and hydrogen chloride to determine whether the reaction is general for cyclic aliphatic ethers. No appreciable reaction took place and no products homologous to the products of this invention could be isolated.

Delta-chlorobutyl formal may be employed as a solvent or plasticizer and is an excellent paint and varnish remover. The chloromethyl chlorobutyl ether may be used as a shrink-proofing agent for wool. Both compounds will have value in the synthesis of alpha-omega dinitriles by reaction with cyanides. These nitriles, and the amines, amides, and acids readily derived therefrom have value as raw materials for resins and synthetic fibers.

The dipolar chlorinated ethers of the present invention may be used for the production of their alkoxy derivatives by reacting the same with a lower aliphatic alcohol and caustic soda. Aliphatic alcohols having one to four carbon atoms react readily with the formals of this invention in the presence of caustic soda to produce alkoxy alkyl formals which are useful as plasticizers and solvents for brushing lacquers containing cellulose acetate and cellulose nitrate.

Delta-chlorobutyl formal may, for example, be reacted with methanol or butanol, in the presence of caustic soda, to produce delta-methoxybutyl formal or delta butoxy butyl formal. The following example illustrates, in detail, a preferred process for the production of delta-methoxybutyl formal.

*Example IV*

Two (2) moles of delta-chlorobutyl formal (458 grams) were refluxed in a stainless steel flask with 400 cc. of methanol and 200 grams (5.0 moles) of solid sodium hydroxide for 18 hours. The product was cooled, and 230 grams of sodium chloride (3.94 moles) filtered off. A yield of 427.5 grams of crude product was obtained which, on distillation, gave 357 grams of the dimethyl ether of the mono-formal derivative of 1,4-butanediol $$(CH_3O(CH_2)_4OCH_2O(CH_2)_4OCH_3)$$

boiling point 130° C. to 140° C. at 12 mm. pressure. It was identified by cryoscopic molecular weight determination in benzene, methoxyl determination, and further alcoholysis.

|  | Calculated | Observed |
|---|---|---|
| Molecular Weight | 220 | 215 |
| $CH_3O$ Content per cent | 28.2 | 27.5 |

Throughout the specification and claims, any reference to parts, proportions and percentages, refers to parts, proportions and percentages by weight unless otherwise specified.

Since it is obvious that many changes and modifications can be made in the above-described details without departing from the nature and spirit of the invention, it is to be understood that the invention is not to be limited to the above-said details except as set forth in the appended claims.

What is claimed is:

1. The process of producing delta-chlorobutyl formal and delta-chlorobutyl chloromethyl ether which comprises bringing together tetrahydrofuran, formaldehyde and hydrogen chloride.

2. The process of producing delta-chlorobutyl formal and delta-chlorobutyl chloromethyl ether which comprises bringing together tetrahydrofuran, formaldehyde and hydrogen chloride, and maintaining the water content of the reaction mixture to less than 50% by weight.

3. The process of producing delta-chlorobutyl formal and delta-chlorobutyl chloromethyl ether which comprises bringing together tetrahydrofuran, formaldehyde and hydrogen chloride at a temperature between 0° C. and the boiling point of the reaction mixture.

4. The process of producing delta-chlorobutyl formal and delta-chlorobutyl chloromethyl ether which comprises bringing together tetrahydrofuran and formaldehyde in a mole ratio of tetrahydrofuran to formaldehyde between 1:3 and 3:1 at a temperature between 10° C. and 40° C., and passing hydrogen chloride gas into said mixture.

5. The process of producing delta-chlorobutyl formal and delta-chlorobutyl chloromethyl ether which comprises bringing together tetrahydrofuran and a formaldehyde polymer which will readily yield formaldehyde under acid conditions in a ratio of tetrahydrofuran to the formaldehyde content of the formaldehyde polymer between 1:3 and 3:1 at a temperature between 10° C. and 40° C., and passing substantially anhydrous hydrogen chloride gas into said mixture.

6. The process of producing delta-chlorobutyl formal which comprises bringing together tetrahydrofuran and formaldehyde in a mole ratio of tetrahydrofuran to formaldehyde between 1.5:1 and 3:1 at a temperature between 10° C. and 40° C., and passing hydrogen chloride gas into said mixture.

7. The process of producing delta-chlorobutyl formal which comprises bringing together tetrahydrofuran and paraformaldehyde in a mole ratio of tetrahydrofuran to the formaldehyde content of the paraformaldehyde between 1.5:1 and 3:1 at a temperature between 10° C. and 40° C., and passing substantially anhydrous hydrogen chloride gas into said mixture.

8. The process of producing delta-chlorobutyl formal which comprises bringing together tetrahydrofuran and paraformaldehyde in a mole ratio of tetrahydrofuran to the formaldehyde content of the paraformaldehyde between 1.5:1 and 3:1 at a temperature between 10° C. and 40° C., passing substantially anyhydrous hydrogen chloride gas into said mixture until no more is consumed in the reaction, and heating said reaction mixture to reflux for a period of two to ten hours.

9. The process of producing delta-chlorobutyl chloromethyl ether which comprises bringing together tetrahydrofuran and formaldehyde in a mole ratio of tetrahydrofuran to formaldehyde between 1:1.5 and 1:3 at a temperature between 10° C. and 40° C., and passing hydrogen chloride gas into said mixture.

10. The process of producing delta-chlorobutyl chloromethyl ether which comprises bringing together tetrahydrofuran and paraformaldehyde in a mole ratio of tetrahydrofuran to the formaldehyde content of the paraformaldehyde between 1:1.5 and 1:3 at a temperature between 10° C. and 40° C., and passing substantially anhydrous hydrogen chloride gas into said mixture.

11. The process of producing delta-chlorobutyl chloromethyl ether which comprises bringing together tetrahydrofuran and paraformaldehyde in a mole ratio of tetrahydrofuran to the formaldehyde content of the paraformaldehyde between 1:1.5 and 1:3 at a temperature between 10° C. and 40° C., and passing substantially anhydrous hydrogen chloride gas into said mixture, in the presence of zinc chloride as a catalyst, until no more hydrogen chloride is consumed in the reaction.

JOSEPH F. WALKER.
THOMAS J. MOONEY.

REFERENCES CITED

The following references are of record in the file of this patent:

FOREIGN PATENTS

| Number | Country | Date |
|---|---|---|
| 551,182 | Great Britain | Feb. 11, 1943 |

OTHER REFERENCES

Sabatier, Catalysis in Organic Chemistry (1922), pages 280–1.
Henry, Ber. 28, 850–1 (1895).
Cass, Ind. & Eng. Chem., 40, 216–19 (Feb. 1948).